(No Model.) 2 Sheets—Sheet 1.

A. KOTT.
SAW TABLE GAGE.

No. 602,261. Patented Apr. 12, 1898.

WITNESSES
INVENTOR
Anthony Kott
By Elliott J. Stoddard
Attorney (No Model.)                               2 Sheets—Sheet 2.
A. KOTT.
SAW TABLE GAGE.
No. 602,261.                    Patented Apr. 12, 1898.
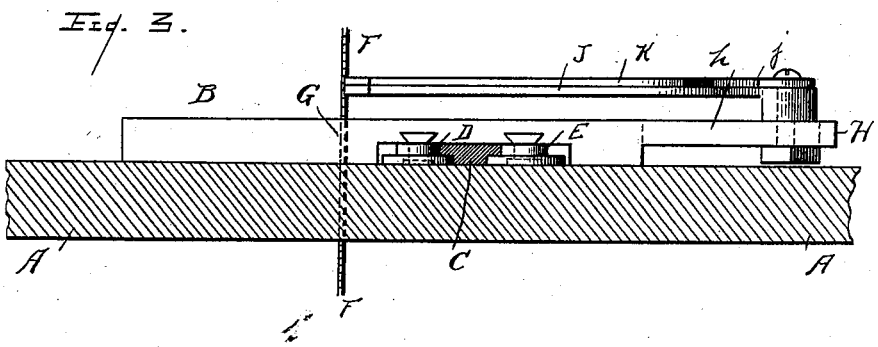
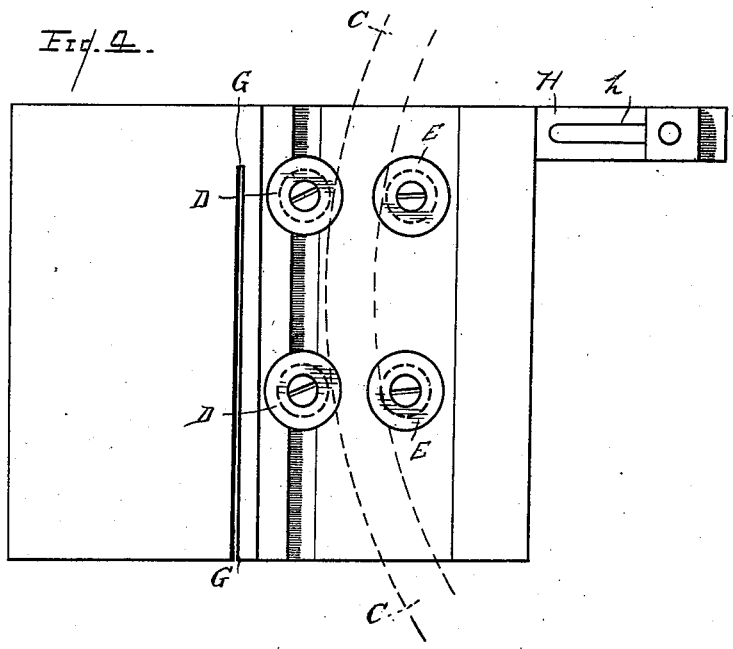
WITNESSES
Henry Hart
William Hart
INVENTOR
Anthony Kott
By Elliott J Stoddard
Attorney

UNITED STATES PATENT OFFICE.

ANTHONY KOTT, OF DETROIT, MICHIGAN.

SAW-TABLE GAGE.

SPECIFICATION forming part of Letters Patent No. 602,261, dated April 12, 1898.

Application filed December 15, 1897. Serial No. 661,941. (No model.)

*To all whom it may concern:*

Be it known that I, ANTHONY KOTT, of Detroit, in the county of Wayne and State of Michigan, have invented a new and useful Improvement in Saw-Table Gages, of which the following is a specification.

My invention relates to saw-table gages; and the object of my improvements is to provide an improved apparatus for sawing out the wood for piano-keys and other special purposes by the use of a band-saw. I attain this object in the device illustrated in the accompanying drawings, in which—

Figure 2:
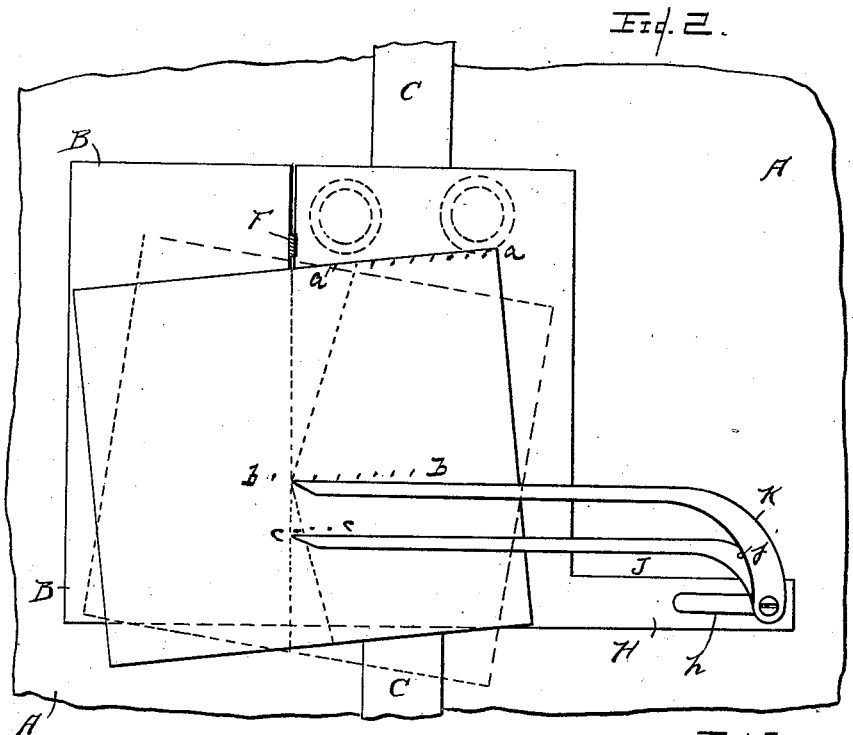
Figure 1:
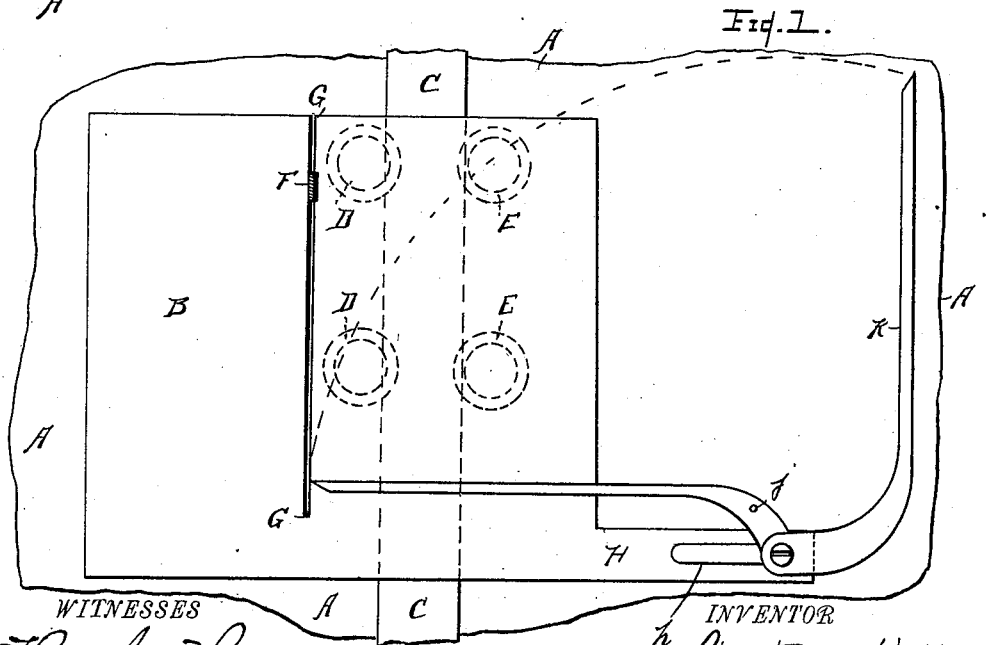

Figure 1 is a plan view of so much of a band-saw and table as is necessary to illustrate my invention, with a gage embodying my invention thereon. Fig. 2 is a plan view of the same, the blank out of which piano-keys are to be formed being shown in full lines in one position and in dotted lines in a second position on the table. Fig. 3 is a section on the line $x\,x$, Fig. 1; and Fig. 4 is a plan view of the saw-table-gage carriage, showing the under side thereof.

The same letters of reference indicate the same parts in all the views.

A is the saw-table.

B is a sliding carriage upon the table A.

C is a guide secured to or upon the table A and extending up into a hollowed-out portion of the carriage B.

D D and E E are rollers journaled upon vertical axes $d\,d$ and $e\,e$ in the hollowed-out portion of the carriage B. Said carriage is guided in its motion by the rollers D D E E pressing against the sides of the guide C.

F is a portion of the saw-blade.

G is a slot cut vertically through and horizontally nearly through the carriage B. The slot G forms a passage-way for the saw-blade F during the forward movement of the carriage B.

H is an arm or offset from the carriage B.

$h$ is a longitudinal slot formed vertically through the arm H.

I is a screw-threaded shaft passing through the slot $h$ and adapted to be secured in various positions in said slot by a nut $i$, the threads of which engage with the threads upon the lower end of the shaft I.

J K are arms pivoted laterally beyond the work-supporting part of the carriage B upon the shaft I, so that they may be swung over the work, with index ends extending approximately to the saw-line of said carriage.

The axes $d\,d$ of the rollers D D are formed with flaring ends adapted to fit into a dovetailed groove in the carriage B, as shown in Fig. 3, so that they may be adjusted to different positions and secured in such position by a screw. This being an ordinary construction will not be further described.

The method of using the above-described device is as follows: If piano-keys are to be cut, the blank is first laid out by points, the line of points $a\,a$ indicating the outer corners of the keys, the line of points $b\,b$ indicating the position of the bends, and the line of points $c\,c$ indicating the inner corners of the keys. The free ends of the arms J K are now adjusted to positions that are vertically over the slot G, or nearly so, and at a distance apart equal to the distance between the bend and outer corners of the keys. The blank is then placed with a point $a$ in front of the saw-blade F and a corresponding point $b$ beneath the outer end of the arm K. The carriage B is then moved forward until the edge of the saw-blade F comes to the outer end of the arm K. The blank is then turned upon the carriage B until the point of the arm J is over a point $c$ to which it is desired that the cut shall be extended. The carriage is again moved forward until the edge of the saw-blade F comes to the outer end of the arm J. The guide C being straight, the two cuts thus made will be perfectly straight, of the right length, and at the right angle to each other. With the above-described device piano-keys may be cut much more rapidly and with greater accuracy than has heretofore been possible.

A curved guide may be used, if desired, in which case the separate cuts will have a corresponding curvilinear form, and the two cuts may be made at any angle to each other in the manner above described for straight cuts, the slot G having a form to correspond with the guide.

If it is not required to use the arms J and K, they may be turned out of the way, as indicated in Fig. 1. A pin $j$ may be placed on the arm J to fix the distance apart of the ends of the two arms, said pin serving as a stop to limit the motion of the arm K toward the arm J.

The guide may of course be upon the carriage and act upon rollers or lugs on the saw-table.

Having fully described my invention, what I claim, and desire to secure by Letters Patent, is—

1. The combination with a saw-table of a carriage, B, adapted to move upon said table, a guide adapted to constrain the motion of said carriage and arms, J K, adjustably secured to, and laterally beyond the work-supporting part of, said carriage, so that they may be adjusted to different positions over the work, said arms having their index ends extending approximately to the saw-line of said carriage, substantially as and for the purpose described.

2. The combination with a saw-table of a carriage, B, adapted to constrain the motion of said carriage, and arms, J K, pivoted laterally to, and beyond the work-supporting part of, said carriage, so that they may be swung over the work with index ends extending approximately to the saw-line of said carriage, substantially as shown and described.

3. The combination with a saw-table of a carriage adapted to move upon said table, a guide adapted to constrain the motion of said carriage, and arms, J K, pivoted upon one axis, said axis being located upon said carriage laterally beyond the work-supporting part thereof, so that said arms may be swung over the work with index ends extending approximately to the saw-line of said carriage, and means for adjusting said axis toward and away from the work-supporting part of said carriage substantially as shown and described.

ANTHONY KOTT.

Witnesses:
 HERMAN HINZ,
 ELLIOTT J. STODDARD.